UNITED STATES PATENT OFFICE.

OSCAR JONAS, OF GRIESHEIM, GERMANY, ASSIGNOR TO CHEMISCHE FABRIK GRIESHEIM ELECTRON, OF FRANKFORT-ON-THE-MAIN, GERMANY, A CORPORATION OF GERMANY.

REMOVAL OF ARSENIC FROM LIQUIDS AND GASES.

No. 891,703.            Specification of Letters Patent.          Patented June 23, 1908.

Application filed March 4, 1907. Serial No. 360,610.

*To all whom it may concern:*

Be it known that I, OSCAR JONAS, a subject of the Emperor of Germany, and a resident of Griesheim-on-the-Main, Germany, have invented certain new and useful Improvements in the Removal of Arsenic from Liquids and Gases, of which the following is a specification.

Further investigations regarding the removal of arsenic from liquids and gases (and especially from sulfuric acid, hydrochloric acid, fluohydric acid and gases which contain sulfur dioxid) have shown me that the benzene derivatives mentioned in my application for Letters Patent of the United States of January 25th 1907 Serial No. 354157 can be replaced by derivatives of the aliphatic hydrocarbons which are not able to form salts for removing arsenic from liquids and gases with advantage and the bodies deprived of arsenic be colorless.

For removing arsenic from sulfuric acid for instance, tetrachlorid of carbon is most suitable.

The process can be carried out for example as follows: Presuming that sulfuric acid of 66° Baumé containing 0.1 per cent. arsenic is to be treated, it is mixed in a stirring vessel with 6 per mille hydrochloric acid of 24° Baumé, or with the equivalent amount of fluohydric acid. 10 per cent. of tetrachlorid of carbon is then added and the whole is well stirred for a few minutes. The mixture is then allowed to become clear and the tetrachlorid of carbon, which now contains the arsenic, is removed. In order to regenerate the tetrachlorid of carbon which has become saturated with arsenic, it is treated with about double its quantity of water whereby the tetrachlorid of carbon will be entirely deprived of its arsenic. The acid from which the arsenic has been removed is quite colorless.

In order to remove arsenic from gases it is preferred to use acetylene tetrachlorid, on account of its high boiling point. If the gases and solvent be allowed to pass in towers in opposite directions, a perfect removal of the arsenic is obtained. The acetylene tetrachlorid can also be regenerated for reuse by removing the arsenic by washing with water.

The aforesaid two bodies possess also the great advantage that they are non-combustible, so that the removal of arsenic can be effected without danger.

Having thus described the invention what is claimed is—

The herein described process of effecting the removal of arsenic from liquids and gases in which the arsenic is in the form of chlorid or fluorid consisting in treating the said liquids or gases with a pure halogen derivative of one of the aliphatic hydrocarbons which are not able to form salts substantially as and for the purpose set forth.

In testimony whereof I have signed my name to this specification in the presence of two subscribing witnesses.

OSCAR JONAS.

Witnesses:
    FRANZ HASSLACHER,
    MICHAEL VOLK.